Nov. 19, 1935.   J. G. PROSSER   2,021,378
REENFORCED PIPE CONSTRUCTION
Filed Nov. 3, 1931
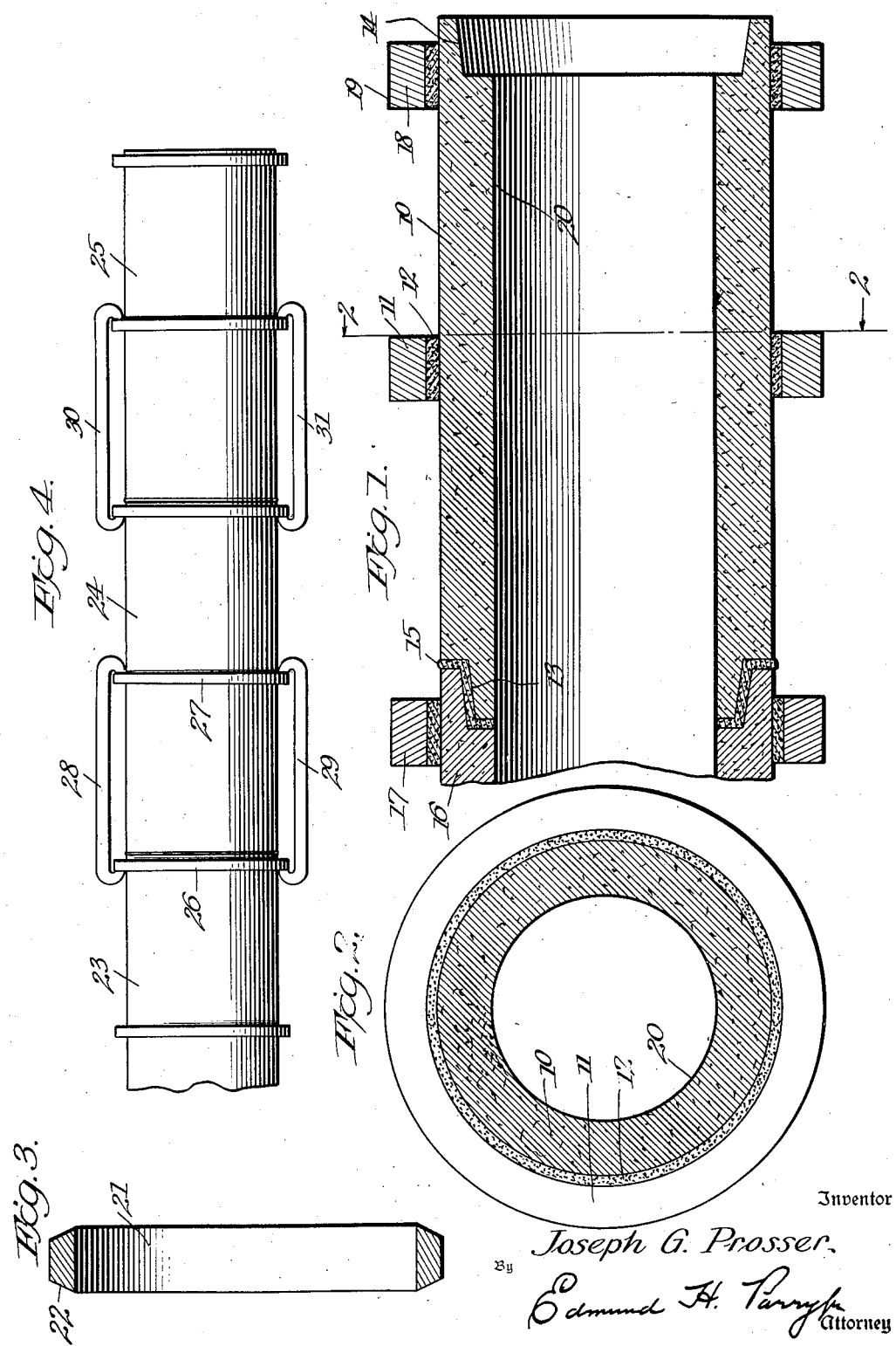
Inventor
Joseph G. Prosser,
By Edmund H. Parry
Attorney Patented Nov. 19, 1935

2,021,378

UNITED STATES PATENT OFFICE 2,021,378

REENFORCED PIPE CONSTRUCTION

Joseph G. Prosser, Chicago, Ill.

Application November 3, 1931, Serial No. 572,846

12 Claims. (Cl. 138—84)

This invention relates to pipes and conduits and has particular reference to a reenforced construction therefor and the method of producing the same.

Both metallic and non-metallic pipes when subjected to internal pressure are likely to split and burst unless the walls are relatively thick, which makes them expensive to manufacture, unduly heavy and difficult to install. This is particularly true in the case of large pipes and conduits such as used to conduct water, gas, steam, and oil, which must be transmitted under relatively high pressures. It is the primary object of the present invention to overcome these disadvantages by providing a reenforced construction for pipes which does not materially increase the cost thereof and which enables pipes to be used under relatively high pressures without danger of bursting and with a minimum wall thickness.

Metallic pipes are ordinarily stronger than pipes of similar proportions made of compositions such as concrete, tile, terra-cotta, and other non-metallic substances. On the other hand, metallic pipes tend to corrode or rust and are, therefore, objectionable as well as relatively expensive for use as a conductor of substances such as liquids and steam. It is, therefore, obvious that non-metallic pipes, if they can be sufficiently strengthened, may be used to considerable advantage in various fields where metallic pipes are now employed.

While the present invention is applicable to metallic pipes for the purpose of increasing the strength thereof, it may be pointed out that the same has particular application to non-metallic pipes of the character above described and enables the use thereof for various purposes to which they have not heretofore been used by reason of their tendency to split or break when subjected to any considerable internal pressure. In the following description I will refer particularly to the application of my reenforced construction to composition pipes such as concrete and other non-metallic substances, in order that the full benefits and advantages of the same may be more clearly appreciated. I do not, however, intend to limit myself in this respect, since the same advantages in less degree may be had from the proposed construction in connection with metallic pipes.

The tendency of non-metallic pipes, such as those made of concrete, to split or burst when subjected to any considerable or sudden pressure may be attributed primarily to the inherent disability of the pipe material to expand or stretch. Concrete, for example, is substantially inelastic, and has little tensile strength, and if subjected to any strain cannot yield and will, therefore, crack, thus rendering it unfit for use in pipes which are subjected to any considerable pressure.

Generally stated, the present invention contemplates the provision of suitable external reenforcements at intervals longitudinally of pipe sections such as will materially increase the strength of the pipes. The proposed reenforcement may be readily applied at a nominal cost according to a novel method hereafter to be described. It has the advantage over pipes which are reenforced by rings or bands embedded in the pipe walls which, since they are not external to the full thickness of the wall, do not strengthen the pipe against internal pressure saving in the portion of the thickness of the wall lying within such rings.

Since pipes are ordinarily made by a molding or casting process, the outer surface thereof frequently is irregular and not truly circular. Also, the diameter of such pipes frequently varies at different longitudinal points. These variations and irregularities must be taken account of in providing an external reenforcement for pipes since, in order to increase the strength of the pipes so as to prevent breakage or cracking, the reenforcing must be uniform throughout the complete circumference.

In providing a suitable reenforced construction I propose to make use of metallic reenforcing bands disposed at suitable intervals along a section of pipe. Such bands may be continuous or of split construction. In the latter case the ends of the band may be conveniently closed by means of suitable bolts. The thickness and width of the bands will be determined according to the length and diameter of the particular pipe sections in connection with which they are to be utilized. Bands having flat inner circumference forming a good bearing surface are preferable to bands of circular cross section for obvious reasons. The bands are preferably made of cast iron or steel so as to give adequate strength and the cross-sectional area should be determined in connection with the thickness of the walls of the pipe, so as to insure sufficient strength without undesirable stretching in the reenforcing band. The latter characteristics are important, particularly where pipes are to be subjected to a relatively high internal pressure.

Due to the importance of having the pipe supported throughout its complete circumference by the reenforcing bands and, bearing in mind the fact that both the outer surface of the pipe and the inner periphery of the reenforcing bands may not be perfect circles due to surface irregularities, it is important that special provision be made to insure complete circumferential support for the pipe. Accordingly, it is proposed to utilize reenforcing bands having an inner diameter slightly larger than the outer diameter of the pipe and to superpose between such surfaces suitable grouting of such character as will fill in irregularities of the elements.

To further insure adequate reenforcement of the pipe, it is important that the same be put under an initial tension by the reenforcing construction so that there is no tendency for the pipe to expand before the reenforcement functions in its proper capacity, since expansion of the pipe might result in cracking thereof. To insure an initial tension, the reenforcing bands may be heated such, for example, as in hot water, and then applied while hot so that upon cooling they will tend to shrink against the grouting. In lieu of shrinking the reenforcing bands, or preferably in addition thereto, it is desirable to use a grouting composed of material which may be applied in a plastic state between the reinforcing bands and pipe, and which will expand upon cooling into hard condition.

Various types of materials may be used as grouting. Plaster of Paris has been used with some degree of success, but I have found that sulphur or sulphur compounds are particularly suited to my purposes by reason of the ability of such materials to be heated to a plastic state and hardened as soon as applied between the reenforcing bands and the pipe. Sulphur, furthermore, readily fills in surface irregularities of the pipe and reenforcing bands and forms a strong binder which will not readily disintegrate under pressure, and which will prevent slippage between the pipe and bands. Furthermore, and what is of particular importance, sulphur expands to a material degree in cooling from a plastic state, thus making it admirable to insure an initial tension between the pipe and reenforcing bands, whether or not the reenforcing bands be heated and then shunk on to the grouting.

In making my reenforced construction for pipes, the reenforcing bands are first slipped over one end of the pipe, the inner diameter of the band being greater than the outer diameter of the pipe to permit the insertion of the grouting. The band is then centered with respect to the pipe and the grouting poured in and allowed to set. To obtain an initial tension the reenforcing band which, as heretofore indicated, is preferably of metal, may be heated and brought into position while hot and, in addition to or in lieu of heating the band, grouting such as sulphur which will expand upon cooling is applied.

It is desirable to use a filler or grouting which can be applied in plastic condition and which will harden and provide a firm layer between the reenforcing band and the pipe, and this whether or not such filler is of a type which expands as it sets. Until the plastic filler becomes hard the same may have some tendency to flow and it will ordinarily be necessary in the course of operations to employ mold members in association with the pipe to prevent the filler from spreading and hold the same in its proper form until hard.

Having now generally set forth the principal features and advantages of the present invention, I will proceed to a detailed description thereof, reference being had in connection therewith to the accompanying drawing in which:

Fig. 1 is a view in longitudinal section of a complete pipe section and a fragmentary portion of a second pipe reenforced according to the present invention;

Fig. 2 is a view taken on line 2—2 of Fig. 1;

Fig. 3 is a view partly in section showing a modified construction for the reenforcing bands shown in Fig. 1; and Fig. 4 is a plan view of several sections of pipe similar to those shown in Fig. 1, particularly illustrating the use of external reenforcements made according to the present invention as a means for facilitating the connection between adjacent pipe sections.

Referring now to Fig. 1, the reference numeral 10 indicates a pipe section which may comprise any metallic or non-metallic material. Externally of the pipe and at suitable intervals are positioned reenforcing bands, 11 preferably made of metal and adapted to strengthen the pipe so as to permit it to withstand relatively high pressures. The sizes of the reenforcing bands will be determined in accordance with the diameter of the pipe and the wall thickness thereof, it being desired that the reenforcing bands be of such width in cross-section as to render them of sufficient strength to meet all conditions of ordinary strain. To insure uniform reenforcement circumferentially of the pipe, reenforcing bands having an inner diameter greater than the outer diameter of the pipe are used to leave a space between the two into which the grouting 12 may be inserted. An initial tension between the band and the pipe may be obtained, according to the process heretofore described, by either heating the reenforcing band so that the same will contract upon cooling, or by using a grouting such as sulpher which can be applied in a plastic state and which will expand upon cooling.

The respective ends 13 and 14 of the pipe are externally and internally shaped, as illustrated in Fig. 1, so as to form a suitable joint between adjacent pipe sections. Ordinarily some kind of sealing compound 15, such as cement, is used to obtain a tight joint between the ends of adjacent pipe sections. A joint and the manner of effecting the same is illustrated in Fig. 1 between the pipe sections 10 and 16.

The number of reenforcing bands for each pipe section will be determined according to the length and diameter of the pipe and the thickness of the pipe wall. If the pipe be of relatively short length, such as shown in Figs. 1, I have found that two reenforcing bands for each pipe section are sufficient, although, of course, more should be used particularly where high pressures are met. The reenforcing band 11 may be conveniently positioned at the middle section of the pipe and the reenforcing band 18 adjacent the end 14 so as to partially overlap the undercut portion of the end. No band need be placed at the other end of a pipe section where a joint similar to that described and illustrated is used since the end of an adjacent pipe section will serve as an adequate reenforcement. Thus, the reenforcing band 17 on the pipe section 16 lends support to the end 13 of the pipe section 10.

In order to prevent deterioration and corrosion of the metallic reenforcing bands, it is desirable to coat the same with a suitable protective substance such as a bituminous compound or waterglass. Such a coating 19 is shown applied to the reenforcing band 18 in Fig. 1. A protective coating is particularly desired where the pipe is to be buried in the ground.

Where the pipe to which my reenforcement is applied is to be used for conducting fluids, such as water, steam, and oil, it is desirable to provide a coating 20 on the inner periphery of the pipe. Considerable advantage is to be attained in connection with composition pipes of concrete or similar materials when used for such purposes by the use of such a coating. Not only does the coating prevent leakage and deterioration of the pipe, but, furthermore, it prevents penetration of a fluid into the pores, small cracks, and crevices in the pipe wall. It will be appreciated that the effective strength of a pipe is no greater than that portion of the pipe wall which is not subject to contact with the substance passing through the pipe. Thus, for example, if a 6-inch pipe has a 1-inch wall and a fluid under pressure is passing through the pipe and can penetrate one-half inch into the wall, then the pressure would be effective over an area with a 7 inch diameter and the reenforcing bands would have to be made correspondingly stronger. Thus, it will be understood that the coating does not only increase the wearing quality of a pipe but, furthermore, cooperates with my external reenforcing construction to enable the pipe to operate effectively at relatively high pressures whatever be the character of the material which is conducted thereby, and enables the use of smaller bands in the external construction.

Where the pipe is to be buried in the ground the reenforcing bands, instead of having a rectangular cross-section such as indicated at 11 in Fig. 1, may have beveled side walls, thus reducing the longitudinal strain in the pipe from expansion or contraction or earth movement. Cement pipe expands with moisture or with heat and contracts under reverse conditions. An unreenforced concrete pipe offers over twice the resistance to a longitudinal strain that it does to the tendency to split open on the diametral line, hence the necessity for proper banding. I have, in Fig. 3, shown a modified form of reenforcing band 21 having beveled walls 22 which may be readily substituted for the bands shown in Fig. 1.

Not only are reenforcing bands of the character heretofore described useful in reenforcing pipes circumferentially, but they can with equal advantage serve to enable adjacent pipe sections to be secured together, and also to reenforce the pipe longitudinally. Since it is ordinarily necessary to effect a sealing contact between the ends of adjacent pipe sections, a suitable sealing compound is used which ordinarily requires some time to harden. After the ends have been sealed, it is necessary for the joint to set without danger of rupture by reason of any bodily movement or longitudinal contraction of the pipe sections. The earth is ordinarily cooler than the pipes when they are laid, and if a pipe line is laid at, say, 100 feet in 30 minutes the contraction of the pipes in cooling will certainly spoil the set of a joint somewhere in the line. In Fig. 4 I have shown three pipe sections 23, 24 and 25 similar to the pipe section 10 shown in Fig. 1 with external reenforcing band 26 of the pipe section 23 and a similar band 27 of the pipe section 24 may be used to insure a tight connection at the joint between the two pipes and also to insure longitudinal reenforcement therebetween. To this end, suitable links or bars 28 connecting between the reenforcing bands 26 and 27 may be applied after the joint has been completed between the pipes 23 and 24. Ordinarily two or three of such links disposed at suitable intervals circumferentially of the pipe are sufficient, and the same may be applied only temporarily while the joint dries, or may be left permanently in place. Similar connecting links 30 and 31 are shown between the pipe sections 24 and 25.

While my proposed reenforcing construction for pipes is relatively simple, a great increase in the strength of pipes may be obtained by making a construction having the characteristics heretofore described. Such factors are highly important in attaining the desired result, and it may be pointed out that the mere use of external reenforcing bands not applied according to the principles of the present invention may lead to very unsatisfactory results. The size, strength and elasticity of the reenforcing bands should be determined in accordance with the proportions and character of the pipe which is to be reenforced, and it is particularly important that the construction be such as to insure a tight tensioning contact between the reenforcing elements and the pipe.

To give a practical illustration of the advantages of my invention I may state that an 18 inch concrete pipe having a 1¾ inch wall when unreenforced cracked and burst under a 130 foot head. When reenforced according to the present invention with cast iron bands having a cross-section of ⅝ by 7/8 of an inch, a similar pipe withstood pressures up to a 250 foot head, thus showing that the strength of the pipe was almost doubled by the use of the present invention under the stated conditions.

It should be borne in mind that a reenforcing band secured on a pipe having any surface irregularities by shrinking or other means will bear on the high spots, and constitutes an unsatisfactory reenforcing construction. There must be a filler having such characteristics that a good fit and equal support at all points will be assured. An unsupported arc in the band may flatten and give enough under moderate pressure to permit breakage of the pipe.

The various features and advantages of my present invention having now been fully described, it will be appreciated that my proposed reenforced pipe construction presents a considerable improvement over prior art structures. It will be understood that the details of construction heretofore described may be varied within a considerable degree without departing from the spirit and intent of the invention and I, therefore, do not propose to limit myself further than required by the accompanying claims.

I claim:

1. The method of reenforcing pipes which consists in applying previously heated reenforcing bands to the periphery of a pipe intermediate the ends of the pipe, said bands being of a size to allow clearance with the pipe, applying a filler between the bands and the pipe while the bands are still hot to form a rigid connection therebetween and insure uniform reenforcement about the whole circumference of the pipe, the reenforcing bands being applied while hot so that upon cooling they will contract about the filler and form a tight connection with the pipe.

2. The method of reenforcing pipes which consists in applying a reenforcing band to the external circumference of the pipe of a size which will leave a space between the peripheries thereof, and filling the space with a grouting heated to a plastic state, the grouting of thermoplastic material being of a character such as will cause the same to expand and harden upon cooling so to form a rigid connection uniform circumferentially between the bands and pipe, and maintaining the reenforcing band in fixed relation to the pipe while the grouting cools.

3. The method of reenforcing pipes which consists in applying a metallic reenforcing band to the external circumference of a pipe of a size which will leave a space between the peripheries thereof, the band being preliminarily heated to cause the same to expand, and, while the band is hot, filling the space with a grouting adapted to form a rigid connection between the band and the pipe, so that as the band cools and contracts a tight reenforcing connection between the band and the pipe will be effected.

4. The method of reenforcing pipes which consists in applying a metallic reenforcing band to the external circumference of a pipe of a size which leaves a space between the peripheries thereof, the band being preliminarily heated to cause the same to expand, and while the band is hot, filling the space with a grouting of thermoplastic material heated to a plastic state, the grouting being of a character such as will cause the same to expand and harden upon cooling, and maintaining the various elements in fixed relation while the reinforcing band cools and contracts and the grouting cools and expands to form a tight reenforcing connection between the band and the pipe.

5. A reenforced construction for pipes comprising reenforcing elements extending circumferentially of a pipe in spaced relation to the pipe periphery and a solidified plastic filler which expands on hardening positioned between the reenforcing elements and the pipe and effecting a tight rigid connection therebetween uniformly throughout their whole circumference.

6. A reenforced construction for pipes comprising reenforcing elements extending circumferentially of a pipe and a sulphurous filler hardened between the reenforcing elements and the pipe adapted to effect a tight rigid connection therebetween uniformly throughout their whole circumference, the reenforcing elements being tensioned about the filler.

7. A reenforced construction for non-metallic pipes, such as of concrete, comprising endless metallic reenforcing bands extending circumferentially of a pipe of such character intermediate its ends, and a solidified expansible plastic filler between the reenforcing elements and the pipe adapted to effect a tight rigid connection therebetween uniformly throughout their whole circumference, the metallic bands being shrunk onto the filler.

8. A reenforced construction for non-metallic pipes, such as of concrete, comprising metallic reenforcing bands extending circumferentially of a pipe of such character, said bands being of greater internal diameter than the circumference of the pipe, and a sulphurous thermoplastic filler hardened into the annular space between the reenforcing bands and the pipe adapted to effect a tight rigid connection therebetween uniformly throughout their whole circumference, the reenforcing elements being tensioned about the filler.

9. In combination, a plurality of pipe sections each having at suitable longitudinal intervals external circumferentially extending reenforcing bands in tight rigid contact with the outer periphery thereof giving uniform reenforcement throughout the whole circumference of the pipe, and longitudinally extending links connecting reenforcing bands of adjacent pipe sections and reenforcing the joints therebetween.

10. The method of reenforcing pipes which consists in encircling the pipe with a reenforcing band of larger diameter than the periphery of the pipe, pouring an expansible thermoplastic grouting heated to its plastic state into the annular space between the pipe and the reenforcing band and allowing the grouting to expand and solidify so as to form a hardened layer and insure uniform reenforcement by the band at all circumferential points of the pipe.

11. A reenforced pipe construction comprising a concrete pipe, an annular band-like layer of plastic material surrounding an intermediate portion of said pipe, and an endless metallic reenforcing band shrunk onto the annular layer, said plastic layer conforming to irregularities in the surfaces of the pipe and the reenforcing band and distributing the tension created by the shrunk on reenforcing band uniformly throughout the circumference of the pipe.

12. A reenforced pipe construction comprising a pipe of annular cross-section, an annular band-like filler layer of hardened plastic material surrounding the periphery of the pipe, and a surrounding metallic reenforcing band tensioned tightly about said annular filler layer and through the medium of said layer exerting a compressive force on the pipe, the plastic filler layer overcoming the effect of irregularities in contour of the pipe periphery and the complementary inner face of the metallic reenforcing band, completely filling the space therebetween, and in its hardened condition said filler layer providing a connection between the tensioned reenforcing band and pipe around the whole periphery of the pipe which is uniformly tight at all points about the pipe circumference.

JOSEPH G. PROSSER.